US011333767B2

(12) United States Patent
Mei

(10) Patent No.: US 11,333,767 B2
(45) Date of Patent: May 17, 2022

(54) AVOIDANCE MODIFIER SYSTEM FOR COLLISION AVOIDANCE SYSTEM

(71) Applicant: Caterpillar Inc., Deerfield, IL (US)

(72) Inventor: Barry Mei, Oswego, IL (US)

(73) Assignee: Caterpillar Inc., Peoria, IL (US)

(*) Notice: Subject to any disclaimer, the term of this patent is extended or adjusted under 35 U.S.C. 154(b) by 644 days.

(21) Appl. No.: 16/373,734

(22) Filed: Apr. 3, 2019

(65) Prior Publication Data

US 2020/0319346 A1 Oct. 8, 2020

(51) Int. Cl.
*G01S 17/931* (2020.01)
*B60K 31/00* (2006.01)
*B60T 7/12* (2006.01)
*G01C 21/16* (2006.01)
*G01S 13/931* (2020.01)
*G01S 15/931* (2020.01)
*G01S 17/46* (2006.01)
*G01S 13/00* (2006.01)
*G01S 17/00* (2020.01)

(52) U.S. Cl.
CPC ........ *G01S 17/931* (2020.01); *B60K 31/0008* (2013.01); *B60T 7/12* (2013.01); *G01C 21/165* (2013.01); *G01S 13/931* (2013.01); *G01S 15/931* (2013.01); *G01S 17/46* (2013.01); *G01S 2013/932* (2020.01); *G01S 2013/93185* (2020.01)

(58) Field of Classification Search
CPC .................................................. G01S 7/4026
See application file for complete search history.

(56) References Cited

U.S. PATENT DOCUMENTS

| 5,635,922 A | * | 6/1997 | Cho ...................... G01S 17/931 340/903 |
|---|---|---|---|
| 5,714,928 A | | 2/1998 | Sudo et al. |
| 6,896,082 B2 | | 5/2005 | Asanuma et al. |
| 8,527,155 B2 | | 9/2013 | Gudat |
| 9,457,753 B2 | * | 10/2016 | Freienstein ........... G01S 7/4026 |

(Continued)

FOREIGN PATENT DOCUMENTS

| CN | 104553981 A | * | 4/2015 | ............... B60Q 9/00 |
|---|---|---|---|---|
| DE | 102016223259 A1 | * | 5/2018 | ........... G01S 7/4026 |
| JP | 2016022804 A | * | 2/2016 | ................ B60T 7/12 |

*Primary Examiner* — Bernarr E Gregory
(74) *Attorney, Agent, or Firm* — Lee & Hayes, PLLC

(57) ABSTRACT

An avoidance modifier system may be configured to modify operation of a collision avoidance system associated with a machine. The avoidance modifier system may include at least one inclination sensor and a modifier system controller configured to be in communication with the collision avoidance system. The modifier system controller may be configured to receive an inclination signal from the inclination sensor and determine an inclination angle at which the machine is operating relative to level operation. The modifier system controller may be configured to determine an adjusted ground plane angle indicative of a virtual ground plane on which the machine is operating, and communicate with the collision avoidance system, such that the collision avoidance system does not activate a braking device of the machine in response to an object sensor generating an object signal indicative of detection of an object between an actual ground plane and the virtual ground plane.

20 Claims, 4 Drawing Sheets

(56) References Cited

U.S. PATENT DOCUMENTS

| | | |
|---|---|---|
| 9,739,038 B2 | 8/2017 | Baba et al. |
| 2005/0080542 A1* | 4/2005 | Lu .......................... B60T 8/172 |
| | | 701/70 |
| 2007/0255498 A1 | 11/2007 | McDaniel et al. |
| 2009/0278675 A1* | 11/2009 | Chen ........................ B60T 7/22 |
| | | 340/453 |
| 2012/0098325 A1 | 4/2012 | Junker et al. |
| 2016/0202351 A1* | 7/2016 | Uotsu .................. G01S 13/931 |
| | | 342/27 |
| 2017/0074984 A1 | 3/2017 | Maisonnier et al. |

* cited by examiner

AVOIDANCE MODIFIER SYSTEM FOR COLLISION AVOIDANCE SYSTEM

TECHNICAL FIELD

The present disclosure relates to a system and method for modifying operation of a collision avoidance system, and more particularly, to a system and method for modifying operation of braking associated with a collision avoidance system.

BACKGROUND

A mobile machine may include a collision avoidance system to prevent unintended collisions with objects, such as other machines or structures. A collision avoidance system may include a sensor for sensing objects and may control operation of the machine to avoid a potential collision with the object. However, the collision avoidance system may mistakenly identify objects and cause the machine to avoid those objects, which may prevent the machine from performing certain desired operations. As a result, it may be desirable to modify operation of a collision avoidance system so that desired operations may be performed.

An attempt to detect a road surface is described in U.S. Pat. No. 6,896,082 B2 to Asanuma et al. ("the '082 patent"), issued May 24, 2005. Specifically, the '082 patent describes a road surface detection apparatus purportedly capable of detecting an upward/downward displacement in radar axis when detecting a road surface by projecting a radar beam. According to the '082 patent, the apparatus projects a radar beam signal onto the road surface on which a radar-equipped vehicle is traveling, and receives a signal containing a reflected signal of the radar beam signal. Thereafter, the apparatus purportedly compares the level of the road surface reflected signal contained in the received signal with a predetermined reference level and if the result of the comparison lies outside a predefined range, the apparatus determines that the axis defining the projection direction of the radar beam signal is displaced.

Although the '082 patent purports to provide a road surface detection apparatus capable of detecting an upward/downward axis displacement when detecting a road surface by projecting a radar beam, the apparatus of the '082 patent does not affect operation of a collision avoidance system. The systems and methods disclosed herein may be directed to mitigating or overcoming one or more of the possible drawbacks set forth above.

SUMMARY

According to a first aspect, an avoidance modifier system may be configured to modify operation of a collision avoidance system associated with a machine. The avoidance modifier system may include at least one inclination sensor configured to generate an inclination signal indicative of an inclination angle at which the machine is operating relative to level operation. The avoidance modifier system may also include a modifier system controller configured to be in communication with the collision avoidance system. The modifier system controller may be configured to receive the inclination signal, determine, based at least in part on the inclination signal, the inclination angle at which the machine is operating relative to level operation, and determine, based at least in part on the inclination angle, an adjusted ground plane angle indicative of a virtual ground plane on which the machine is operating. The modifier system controller may also be configured to communicate with the collision avoidance system, such that the collision avoidance system does not activate a braking device of the machine in response to an object sensor generating an object signal indicative of detection of an object between an actual ground plane and the virtual ground plane.

According to a further aspect, a control system for a machine may include a collision avoidance system configured to assist the machine with avoiding a collision between the machine and an object in an environment through which the machine maneuvers along a path. The collision avoidance system may include at least one object sensor configured to generate an object signal indicative of an object, and a braking controller configured to control activation of a braking device coupled to the machine. The braking controller may be configured to reduce a travel speed at which the machine maneuvers. The collision avoidance system may also include an avoidance controller configured to receive the object signal from the at least one object sensor, determine whether the object is in the path, and upon determining the object is in the path, activate the braking device, such that the travel speed of the machine is at least one of reduced, stopped, or prevented from increasing. The control system may further include an avoidance modifier system configured to modify operation of the collision avoidance system. The avoidance modifier system may include at least one inclination sensor configured to generate an inclination signal indicative of an inclination angle at which the machine is operating relative to level operation. The avoidance modifier system may also include a modifier system controller in communication with the collision avoidance system. The modifier system controller may be configured to receive the inclination signal, determine, based at least in part on the inclination signal, an adjusted ground plane angle indicative of a virtual ground plane on which the machine is operating, and communicate with the collision avoidance system, such that the collision avoidance system does not activate the braking device in response to receipt of the object signal from the at least one object sensor.

According to another aspect, a method for modifying operation of a collision avoidance system associated with a machine may include receiving an inclination signal indicative of an inclination angle at which a machine is operating relative to level operation, and determining, based at least in part on the inclination signal, an inclination angle at which the machine is operating relative to level operation. The method may also include determining, based at least in part on the inclination angle, an adjusted ground plane angle indicative of a virtual ground plane on which the machine is operating, and communicating with a collision avoidance system, such that the collision avoidance system does not activate a braking device in response to an object sensor generating an object signal indicative of detection of an object between an actual ground plane and the virtual ground plane.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
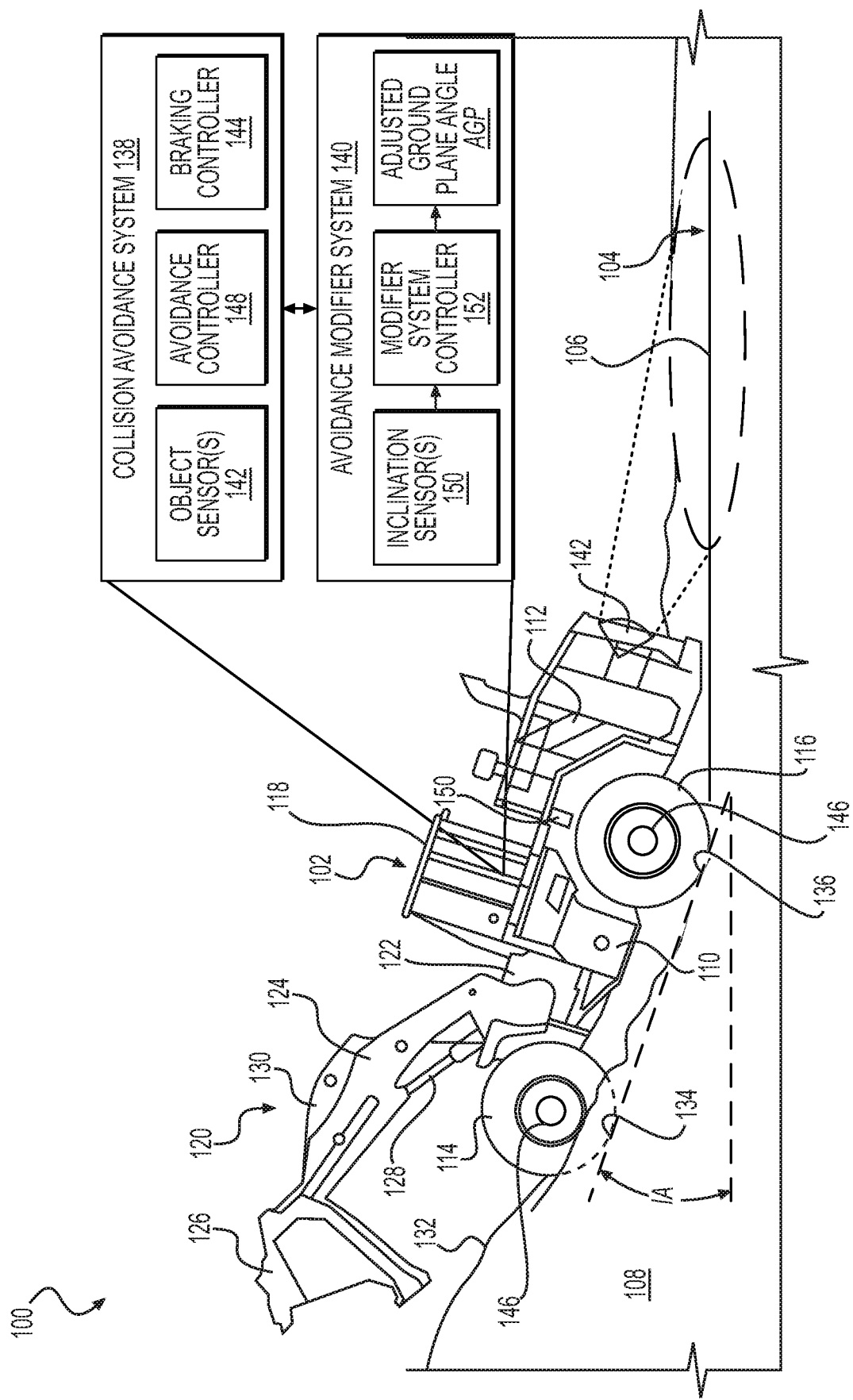
FIG. 1 is a schematic side view of an example machine, including an example collision avoidance system and an example avoidance modifier system, operating at an example inclination angle.

FIG. 1 schematically depicts an example environment 100 in which an example machine 102 operates. Example environment 100 includes example terrain 104 having an actual ground plane 106, which, in the example shown, is substantially horizontal or level. Actual ground planes oriented at an angle relative to horizontal or level are contemplated. In the example shown, machine 102 has travelled partially up an example material pile 108, which may include any material able to be piled, such as for example, earth, gravel, refuse, etc. For example, machine 102 may be performing an example stockpiling operation in which machine 102 is depositing material higher up material pile 108.

Example machine 102 shown in FIG. 1 is an example wheel loader. However, machine 102 may be any type of machine configured to travel across terrain, such as, for example, an automobile, a truck, an agricultural vehicle, and/or construction vehicles, such as, for example, a wheel loader, a track loader, a dozer, a skid-steer loader, a grader, an on-highway truck, an off-highway truck, and/or any other machine known to a person skilled in the art. Example machine 102 shown in FIG. 1 includes a chassis 110 to which is coupled a power source 112 to supply power for operation of machine 102, including, for example, operating work implements, electronics, and steering, and/or for supplying torque to drive members to propel machine 102 across terrain 104. For example, machine 102 includes front wheels 114 (only one shown) and rear wheels 116 (only one shown) coupled to chassis 110 and configured to propel machine 102 across terrain 104. Although example machine 102 includes wheels 114 and 116, it is contemplated that machine 102 may include one of more tracks instead of, or in addition to, wheels 114 and 116. Example machine 102 also includes a cab 118 coupled to chassis 110 for protecting and/or providing comfort for an operator of machine 102 and/or for protecting control-related devices of machine 102. In some examples, machine 102 may be semi-autonomous or fully autonomous, for example, and may be able to operate without an onboard or remote operator. Example machine 102 also includes a work implement 120 for performing operations associated with machine 102, such as, for example, digging, shaving, smoothing, carrying, raising, and/or depositing material. For example, example machine 102 includes a frame 122 coupled to chassis 110, a boom 124 having a proximal end coupled to frame 122 and configured to pivot relative to frame 122, and a bucket 126 coupled to a distal end of boom 124 and configured to pivot relative to boom 124. Example machine 102 also includes a boom actuator 128 coupled at one end to chassis 110 and at an opposite end to boom 124 and configured to extend and retract, thereby raising and lowering the distal end of boom 124, respectively. Example machine 102 also includes a bucket actuator 130 coupled at one end to frame 122 and/or to the proximal end of boom 124 and configured to extend and retract, thereby pivoting bucket 126 between an upright orientation, for example, for holding material in bucket 126, and an at least partially inverted orientation, for example, for depositing or dumping material from bucket 126. Other forms of work implements are contemplated.

As shown in FIG. 1, example machine 102 is operating on an incline 132 created by material pile 108. As shown, incline 132 defines an inclination angle IA relative to actual ground plane 106. In the example shown, inclination angle IA is defined by a front contact surface 134 between front wheel 114 and the surface of material pile 108 on which front wheel 114 is supported, and a rear contact surface 136 between rear wheel 116 and the surface of material pile 108 on which rear wheel 116 is supported. Similarly, when machine 102 is supported by actual ground plane 106, actual ground plane 106 may be defined by a front contact surface between front wheel 114 and terrain 104 supporting front wheel 114 and a rear contact surface between rear wheel 116 and terrain 104 supporting rear wheel 116. In some examples, level operation of machine 102 may correspond to an axis extending between (1) a front contact surface between front wheel 114 of machine 102 and terrain 104 supporting front wheel 114 and (2) a rear contact surface between rear wheel 116 of machine 102 and terrain 104 supporting rear wheel 116, wherein, for example, the axis is substantially horizontal or level.

As shown in FIG. 1, example machine 102 includes an example collision avoidance system 138 and an example avoidance modifier system 140. Although FIG. 1 schematically depicts avoidance modifier system 140 as being separate from collision avoidance system 138, in some examples, all or portions of avoidance modifier system 140 may be part of (or integrated into) collision avoidance system 138. Example collision avoidance system 138 may be configured to assist an operator of machine 102 (e.g., aboard machine 102 or remote from machine 102), or an autonomous machine, with avoiding a collision between machine 102 and an object in environment 100 through which machine 102 maneuvers along a path. As shown in FIG. 1, some examples of collision avoidance system 138 may include at least one object sensor 142 configured to generate an object signal indicative of an object. One or more object sensors 142 may include, for example, one or more imagers (e.g., one or more cameras), one or more a light detection and ranging (LIDAR) sensors, one or more sound navigation ranging (SONAR) sensors, or one or more radio detection and ranging (RADAR) sensors, or any other suitable sensor type. In some examples, the one or more sensors 142 may be mounted to machine 102, for example, at a front end 144 of machine 102. It is contemplated that the one or more sensors 142 may be additionally, and/or alternatively, mounted at many different locations of machine 102.

Example collision avoidance system 138 shown in FIG. 1 also includes a braking controller 144 configured to control activation of one or more braking devices 146 coupled to machine 102 and configured to slow a travel speed of machine 102, stop machine 102, and/or hold machine 102 at a fixed location on terrain 104 and/or incline 132. For example, braking controller 144 may be configured to reduce a travel speed at which machine 102 maneuvers by activating one or more of the braking devices 146. In some examples, collision avoidance system 138 may also include an avoidance controller 148 configured to receive the object signal from the one or more object sensors 142 and determine whether the object is in the path of machine 102. Upon determining the object is in the path, avoidance controller 146, in some examples, may be configured to activate one or more of one or more braking devices 146, for example, such that the travel speed of machine 102 is reduced and/or stopped. In this example manner, collision avoidance system 138 may sense an object in the path of machine 102, and upon detection cause activation of one or more of braking devices 146, for example, so that machine 102 avoids collision with the detected object and/or assists an operator of machine 102 with avoiding the detected object, for example, by slowing the travel speed of machine 102 and/or stopping machine 102 before machine 102 collides with the detected object.

Under certain circumstances, a collision avoidance system, for example, at least similar to collision avoidance system 138, may hinder or prevent operation of machine 102 in a desired manner. For example, as shown in FIG. 1, during a stockpiling operation in which material of material pile 108 is moved further up material pile 108 or additional material is added to material pile 108, machine 102 may travel at least partially up incline 132 of material pile 108. As schematically depicted in FIG. 1, under such circumstances, one or more of object sensors 142 may detect actual ground plane 106, for example, in a manner at least similar to detecting an object. If and/or when the operator of machine 102 would like to reverse the direction of travel of machine 102, such that machine 102 travels down incline 132 (e.g., backs down incline 132), collision avoidance system 138 may activate one or more of braking devices 146 as a result of one or more object sensors 142 detecting actual ground plane 106. Thus, in such example instances, collision avoidance system 138 may hinder or prevent machine 102 from travelling down incline 132, which may be undesirable.

As shown in FIG. 1, example avoidance modifier system 140 may be configured to modify operation of collision avoidance system 138, for example, such that collision avoidance system 138 does not hinder or prevent machine 102 from travelling down incline 132. For example, avoidance modifier system 140 may include one or more inclination sensors 150 configured to generate an inclination signal indicative of inclination angle IA at which machine 102 is operating relative to level operation. One or more inclination sensors 150 may include, for example, one or more accelerometers, one or more inertial measurement units, and/or other known sensors that may be configured to generate one or more signals indicative of inclination of an incline.

Figure 2:
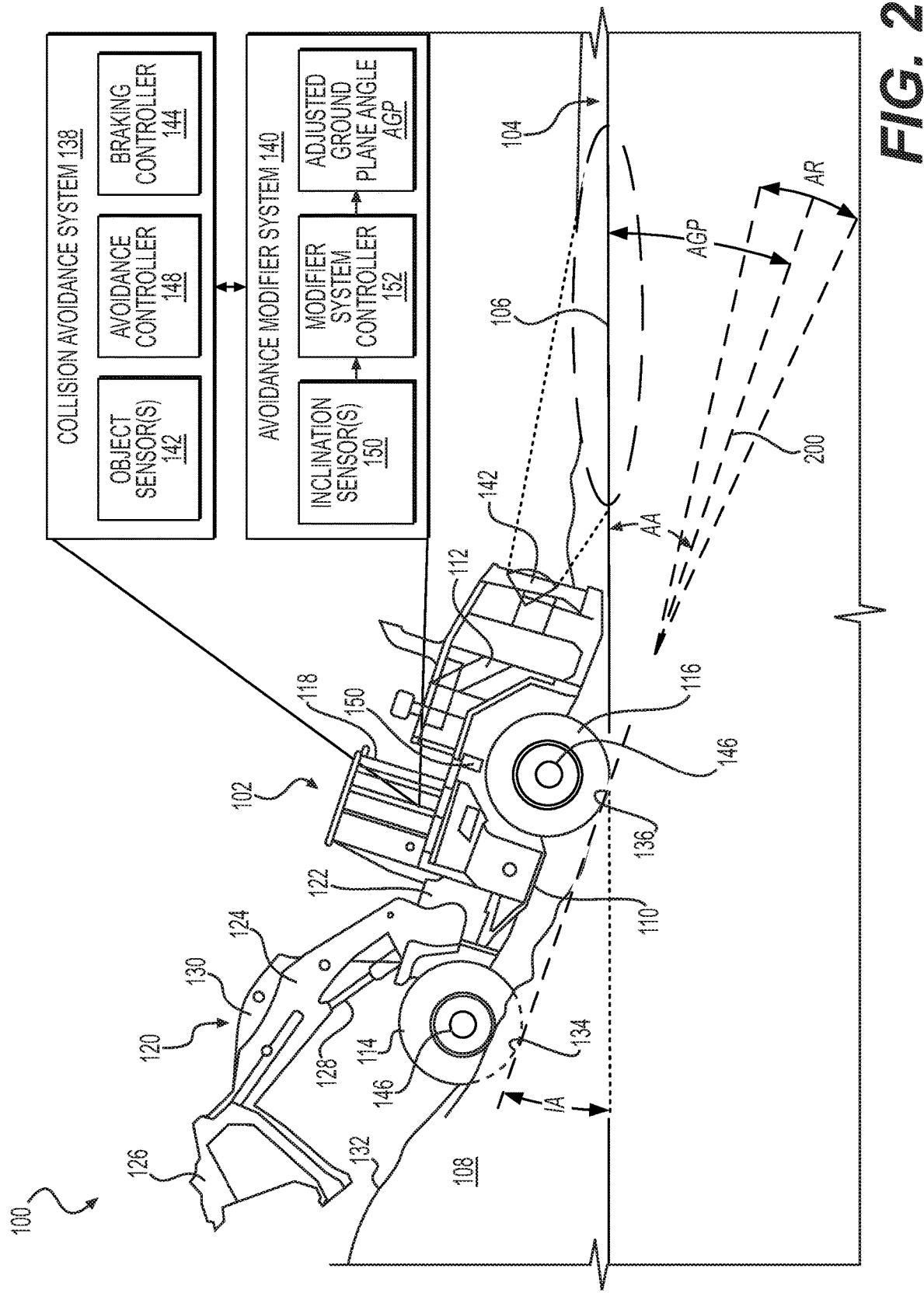
FIG. 2 is a schematic side view of an example machine, including an example collision avoidance system and an example avoidance modifier system, operating at an example inclination angle, and schematically depicting an example virtual ground plane and associated angles.

As shown in FIGS. 1 and 2, example avoidance modifier system 140 shown also includes a modifier system controller 152 in communication with collision avoidance system 138. In some examples, modifier system controller 152 may be configured to receive one or more inclination signals and determine, based at least in part on the one or more inclination signals, an adjusted ground plane angle AGP indicative of a virtual ground plane 200 (see FIG. 2) on which machine 102 is operating. As shown in FIGS. 1 and 2, example modifier system controller 152 may also be configured to communicate with collision avoidance system 138, such that collision avoidance system 138 does not activate the one or more braking devices 146 in response to receipt of the object signal from the one or more object sensors.

In some examples, collision avoidance system 138 may also include or be configured to activate a warning system. In some examples, the warning system may include a warning device and may be configured to activate the warning device upon receipt of one or more object signals indicative of an object. In some examples, collision avoidance system 138 may be configured to activate the warning device, for example, even when avoidance modifier system 140 prevents activation of one or more braking devices 146. In some examples, the warning system may include a warning light and/or an audible warning tone, for example, mounted in the cab 118 and/or mounted in a location from which the operator of machine 102 is able to see and/or hear the warning device while operating machine 102.

FIG. 2 schematically depicts an example machine 102, an example collision avoidance system 138, and an example avoidance modifier system 140. As shown in FIG. 2, example machine 102 is shown in FIG. 2 during a stockpiling operation in which material of material pile 108 is moved further up material pile 108 or additional material is added to material pile 108. As a result, machine 102 is located at least partially on incline 132 of material pile 108. As schematically depicted in FIG. 2, one or more of object sensors 142 is detecting actual ground plane 106, for example, in a manner at least similar to detecting an object. Thus, under some examples of normal operation, collision avoidance systems 138 may activate one or more of braking devices 146 as a result of one or more object sensors 142 detecting actual ground plane 106, and thus, in such example instances, collision avoidance system 138 may hinder or prevent machine 102 from traveling down incline 132, which may be undesirable, as described herein.

As shown in FIG. 2, example avoidance modifier system 140 may be configured to modify operation of collision avoidance system 138, for example, such that collision avoidance system 138 does not hinder or prevent machine 102 from travelling down incline 132. For example, the one or more inclination sensors 150 may generate an inclination signal indicative of inclination angle IA at which machine 102 is operating relative to level operation. The modifier system controller 152 may be in communication with collision avoidance system 138, and modifier system controller 152 may receive the one or more inclination signals and determine, based at least in part on the one or more inclination signals, an adjusted ground plane angle AGP indicative of virtual ground plane 200 on which machine 102 is operating. As explained herein, modifier system controller 152 may be configured to communicate with collision avoidance system 138, such that collision avoidance system 138 does not activate one or more braking of devices 146 in response to receipt of the one or more object signals from the one or more object sensors 142.

For example, modifier system controller 152 may communicate with collision avoidance system 138, such that collision avoidance system 138 does not activate the one or more of braking devices 146 of machine 102 in response to one or more object sensors 142 generating one or more object signals indicative of detection of an object between actual ground plane 106 and virtual ground plane 200. As shown, any object signals associated with the terrain 104 between actual plane 106 and virtual plane 200, for example, are not indicative of an object with which machine 102 would collide when travelling down (e.g., reversing direction to maneuver off) incline 132 of material pile 108 (i.e., within ground clearance limitations of machine 102). Thus, avoidance modifier system 140, in some examples, may prevent or limit occurrences of collision avoidance system from activating one or more of braking devices 146 and hindering or preventing machine 102 from maneuvering off incline 132.

As schematically shown in FIG. 2, in some examples, adjusted ground plane angle AGP may be substantially equal to inclination angle IA, and in some examples, may be opposite relative to inclination angle IA. In some examples, adjusted ground plane angle AGP may be vary slightly from inclination angle IA, for example, from about one to about five degrees different, or from about one to about ten degrees different, or from about five to about ten degrees different. In some examples, actual ground plane 106 and virtual ground plane 200 define an acute angle AA.

As schematically shown in FIG. 2, in some examples, adjusted ground plane angle AGP may range according to an angle range AR from, for example, about two degrees greater than inclination angle IA to about two degrees less than the inclination angle IA, from about three degrees greater than inclination angle IA to about three degrees less than the inclination angle IA, or from about five degrees greater than inclination angle IA to about five degrees less than the inclination angle IA.

Figure 3:
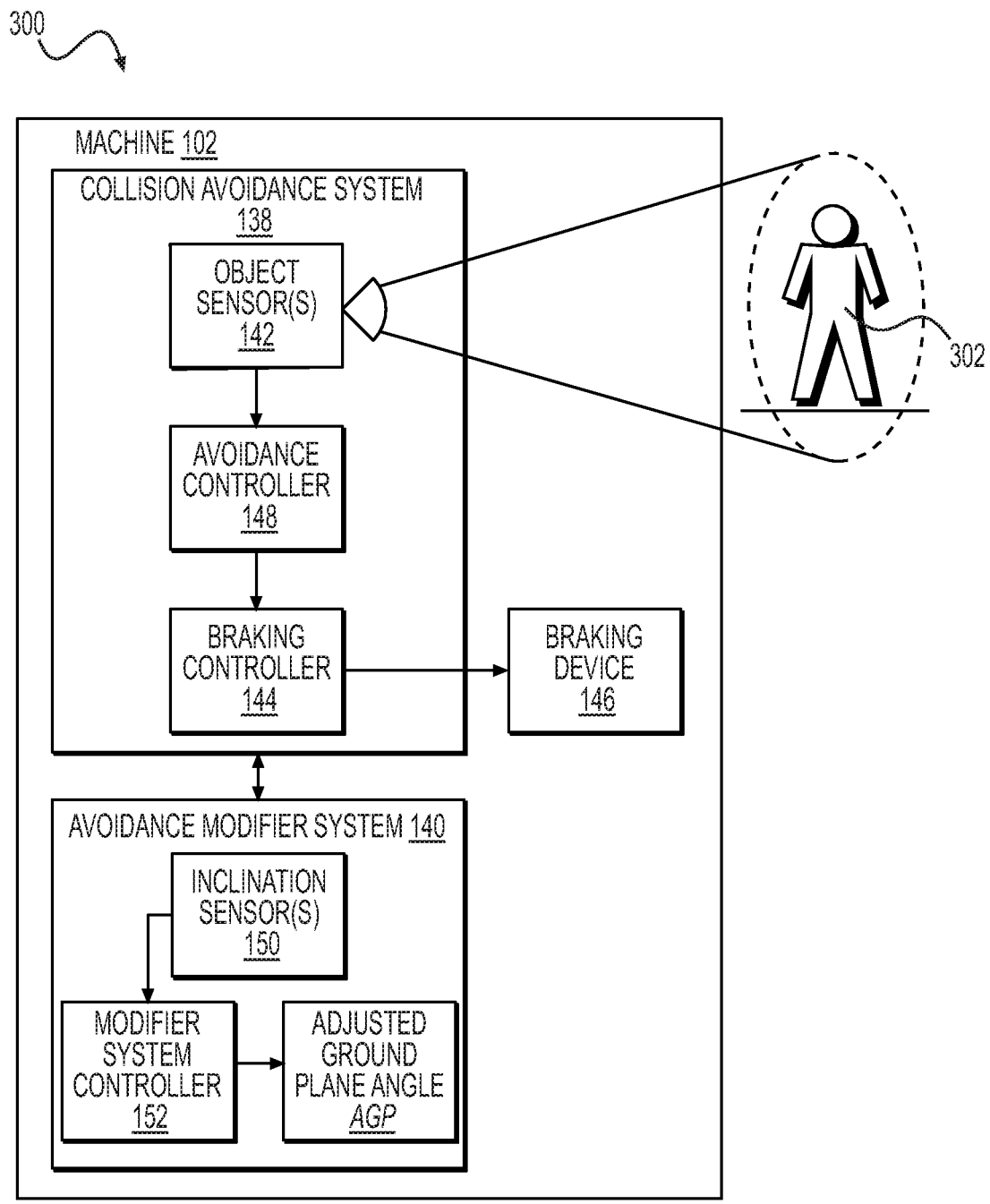
FIG. 3 schematically depicts an example machine control system architecture, including an example collision avoidance system and an example avoidance modifier system.

FIG. 3 schematically depicts an example machine control system architecture 300, including an example collision avoidance system 138 and an example avoidance modifier system 140. One or more of collision avoidance system 138 or avoidance modifier system 140 may include one or more processors, which may execute any modules associated with collision avoidance system 138 and/or avoidance modifier system 140 to cause collision avoidance system 138 and/or avoidance modifier system 140 to perform a variety of functions, as set forth above and explained in further detail herein. In some examples, the processor(s) may include a central processing unit (CPU), a graphics processing unit (GPU), both CPU and GPU, or other processing units or components known in the art. Additionally, each of the processors may possess its own local memory, which also may store program modules, program data, and/or one or more operating systems.

Computer-readable media associated with collision avoidance system 138 and/or avoidance modifier system 140 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with collision avoidance system 138 and/or avoidance modifier system 140. In some examples, one or more of the above-noted modules may include or be associated with computer-executable instructions that are stored by the computer-readable media and that are executable by one or more processors to perform such operations. Collision avoidance system 138 and/or avoidance modifier system 140 may also include additional components not listed above that may perform any function associated with collision avoidance system 138 and/or avoidance modifier system 140. Collision avoidance system 138 and/or avoidance modifier system 140 may communicate with one another using any known wired and/or wireless communication protocols and/or networks.

As shown in FIG. 3, example machine control system architecture 300 includes example collision avoidance system 138 and avoidance modifier system 140. As shown in FIG. 3, example collision avoidance system 138 includes object sensor(s) 142 configured to generate an object signal indicative of an object, such as, for example, a person 302 in the travel path of machine 102. Example collision avoidance system 138 shown in FIG. 3 also includes braking controller 144 configured to control activation of one or more braking devices 146 coupled to machine 102 and configured to slow a travel speed of machine 102, stop machine 102, and/or hold machine 102 at a fixed location on terrain 104 and/or incline 132. Example collision avoidance system 138 shown in FIG. 3 also includes avoidance controller 148 configured to receive the object signal from one or more object sensors 142 and determine whether the object (e.g., person 302) is in the path of machine 102. Upon determining the object is in the path, avoidance controller 146, in some examples, may be configured to activate one or more of one or more braking devices 146, for example, such that the travel speed of machine 102 is reduced and/or stopped. In this example manner, collision avoidance system 138 may sense an object in the path of machine 102, and upon detection cause activation of one or more of braking devices 146, for example, so that machine 102 avoids collision with the detected object and/or assists an operator of machine 102 with avoiding the detected object, for example, by slowing the travel speed of machine 102 and/or stopping machine 102 before machine 102 collides with the detected object.

Example avoidance modifier system 140 shown in FIG. 3 may be configured to modify operation of collision avoidance system 138, for example, such that collision avoidance system 138 does not hinder or prevent machine 102 from travelling down incline 132, for example, as described with respect to FIGS. 1 and 2. Example avoidance modifier system 140 shown in FIG. 3 also includes one or more inclination sensors 150 configured to generate an inclination signal indicative of inclination angle IA at which machine 102 is operating relative to level operation. Example avoidance modifier system 140 shown in FIG. 3 also includes a modifier system controller 152 in communication with collision avoidance system 138 and configured to receive one or more inclination signals and determine, based at least in part on the one or more inclination signals, an adjusted ground plane angle AGP indicative of virtual ground plane 200 (see FIG. 2) on which machine 102 is operating. As shown in FIG. 3, example modifier system controller 152 is configured to communicate with collision avoidance system 138, such that collision avoidance system 138 does not activate one or more braking devices 146 in response to receipt of the object signal from one or more object sensors 142.

Figure 4:
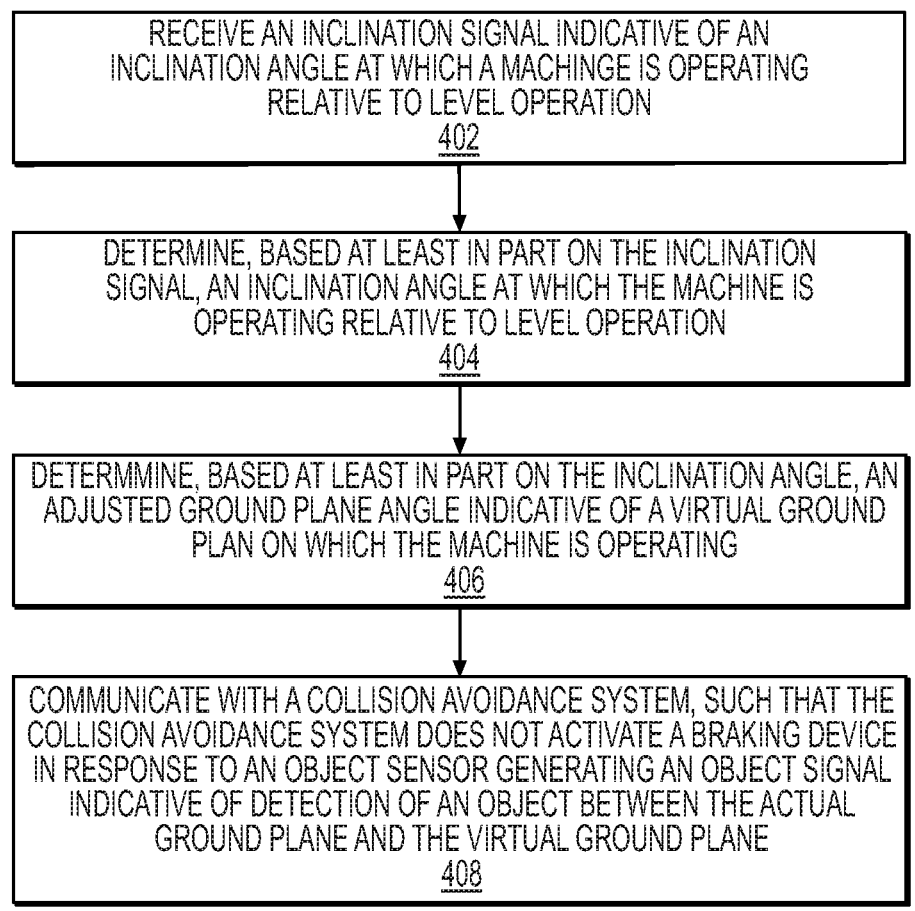
FIG. 4 is a block diagram of an example process for modifying operation of a collision avoidance system.

FIG. 4 illustrates an example process for modifying operation of a collision avoidance system associated with a machine. This process is illustrated as a logical flow graph, operation of which represents a sequence of operations, at least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 for modifying operation of a collision avoidance system associated with a machine. The following actions described with respect to FIG. 4 may be performed, for example, as illustrated with respect to FIGS. 1-3. The example process 400, at 402, may include receiving an inclination signal indicative of an inclination angle at which a machine is operating relative to level operation, for example, as described herein. In some examples, one or more sensors coupled to the machine may be configured to generate one or more inclination signals. For example, the machine may include an avoidance modifier system, and the avoidance modifier system may be configured to receive one or more inclination signals generated by one or more accelerometers, one of more inertial measurement units, and/or other types of sensors configured to generate inclination signals.

The example process 400, at 404, may include determining, based at least in part on the inclination signal, an inclination angle at which the machine is operating relative to level operation, for example, as described herein. For example, during level operation, an axis extending between (1) a contact surface between a front wheel of the machine and terrain supporting the front wheel and (2) a contact surface between a rear wheel of the machine and terrain supporting the rear wheel, is substantially horizontal. An actual ground plane may be substantially parallel to the axis.

The example process 400, at 406, may include determining, based at least in part on the inclination angle, an adjusted ground plane angle indicative of a virtual ground plane on which the machine is operating, for example, as described herein. In some examples, determining the adjusted ground plane angle may include setting the adjusted ground plane angle substantially equal to the inclination angle. In some examples, determining the adjusted ground plane angle may include setting the adjusted ground plane angle, such that it ranges from about two degrees greater than the inclination angle to about two degrees less than the inclination angle.

The example process 400, at 408, may also include communicating with a collision avoidance system, such that the collision avoidance system does not activate a braking device in response to an object sensor generating an object signal indicative of detection of an object between the actual ground plane and the virtual ground plane.

INDUSTRIAL APPLICABILITY

The exemplary systems and related methods of the present disclosure may be applicable to a variety of machines, for example, any machine configured to travel across terrain, such as, for example, an automobile, a truck, an agricultural vehicle, and/or construction vehicles, such as, for example, a wheel loader, a track loader, a dozer, a skid-steer loader, a grader, an on-highway truck, an off-highway truck, and/or any other machine known to a person skilled in the art. For example, some machines may include a collision avoidance system configured to assist a machine operator (e.g., aboard the machine or remote from the machine), or an autonomous machine, with avoiding collisions with other machines and/or objects. For example, a collision avoidance system may include a braking controller configured to control activation of one or more braking devices coupled to the machine and configured to slow a travel speed of the machine, stop machine, and/or hold the machine at a fixed location on the supporting terrain and/or incline. For example, the braking controller may be configured to reduce a travel speed at which the machine maneuvers by activating one or more of the braking devices. In some examples, a collision avoidance system may also include an avoidance controller configured to receive an object signal from the one or more object sensors and determine whether an object is in the path of the machine, and upon determining the object is in the path, the avoidance controller, in some examples, may be configured to activate one or more of the one or more braking devices, for example, such that the travel speed of the machine is reduced and/or stopped. In this example manner, a collision avoidance system may sense an object in the path of the machine, and upon detection, cause activation of one or more of the braking devices, so that the machine avoids collision with the detected object and/or assists an operator of the machine with avoiding the detected object, for example, by slowing the travel speed of the machine and/or stopping the machine before the machine collides with the detected object.

Under certain circumstances, a collision avoidance system may hinder or prevent operation of the machine in a desired manner. For example, during a stockpiling operation in which material of a material pile is moved further up a material pile or additional material is added to a material pile, the machine may travel at least partially up an incline of the material pile. Under such circumstances, one or more of object sensors may detect the actual ground plane next to the material pile, for example, in a manner at least similar to detecting an object. If and/or when the operator of machine would like to travel off of the incline (e.g., reverse the direction and travel of the machine, such that the machine backs down incline) the collision avoidance system may activate one or more of the braking devices as a result of the one or more object sensors detecting the actual ground plane. Thus, in such example instances, the collision avoidance system may hinder or prevent the machine from travelling down the incline of the material pile, which may be undesirable.

In some examples, the avoidance modifier system or method may modify operation of the collision avoidance system, for example, such that the collision avoidance system does not hinder or prevent the machine from travelling down the incline. For example, the avoidance modifier system or method may receive one or more inclination signals indicative of an inclination angle at which the machine is operating relative to level operation. The avoidance modifier system or method may use a modifier system controller in communication with the collision avoidance system, and the modifier system controller may receive the one or more inclination signals and determine, based at least in part on the one or more inclination signals, an adjusted ground plane angle indicative of a virtual ground plane on which the machine is operating. In some examples, the modifier system controller may communicate with the collision avoidance system, such that the collision avoidance system does not activate the one or more braking devices in response to receipt of the object signal from the one or more object sensors. Thus, in at least some examples, this may prevent, or reduce the likelihood, that a collision avoidance system may hinder or prevent a machine from travelling down an incline, for example, when the collision avoidance system detects relatively level ground.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An avoidance modifier system configured to modify operation of a collision avoidance system associated with a machine, the avoidance modifier system comprising:
    at least one inclination sensor configured to generate an inclination signal indicative of an inclination angle at which the machine is operating relative to level operation; and a modifier system controller configured to be in communication with the collision avoidance system, the modifier system controller configured to:
receive the inclination signal;
determine, based at least in part on the inclination signal, the inclination angle at which the machine is operating relative to level operation;
determine, based at least in part on the inclination angle, an adjusted ground plane angle indicative of a virtual ground plane on which the machine is operating; and
communicate with the collision avoidance system, such that the collision avoidance system does not activate a braking device of the machine in response to an object sensor generating an object signal indicative of detection of an object between an actual ground plane and the virtual ground plane.

2. The avoidance modifier system of claim 1, wherein the at least one inclination sensor comprises at least one of an accelerometer or an inertial measurement unit.

3. The avoidance modifier system of claim 1, wherein the adjusted ground plane angle is substantially equal to the inclination angle.

4. The avoidance modifier system of claim 1, wherein the adjusted ground plane angle ranges from about two degrees greater than the inclination angle to about two degrees less than the inclination angle.

5. The avoidance modifier system of claim 1, wherein during level operation, an axis extending between (1) a contact surface between a front wheel of the machine and terrain supporting the front wheel and (2) a contact surface between a rear wheel of the machine and terrain supporting the rear wheel, is substantially horizontal.

6. The avoidance modifier system of claim 5, wherein the actual ground plane is substantially parallel to the axis, and wherein the modifier system controller is configured to modify operation of the collision avoidance system, such that the braking device is not activated upon detection of objects between the actual ground plane and the virtual ground plane.

7. The avoidance modifier system of claim 6, wherein the actual ground plane and the virtual ground plane define an acute angle.

8. A control system for a machine, the system comprising:
a collision avoidance system configured to assist the machine with avoiding a collision between the machine and an object in an environment through which the machine maneuvers along a path, the collision avoidance system comprising:
at least one object sensor configured to generate an object signal indicative of an object;
a braking controller configured to control activation of a braking device coupled to the machine, the braking controller configured to reduce a travel speed at which the machine maneuvers; and
an avoidance controller configured to:
receive the object signal from the at least one object sensor;
determine whether the object is in the path; and
upon determining the object is in the path, activate the braking device, such that the travel speed of the machine is at least one of reduced, stopped, or prevented from increasing; and
an avoidance modifier system configured to modify operation of the collision avoidance system, the avoidance modifier system comprising:
at least one inclination sensor configured to generate an inclination signal indicative of an inclination angle at which the machine is operating relative to level operation; and
a modifier system controller in communication with the collision avoidance system, the modifier system controller configured to:
receive the inclination signal;
determine, based at least in part on the inclination signal, an adjusted ground plane angle indicative of a virtual ground plane on which the machine is operating; and
communicate with the collision avoidance system, such that the collision avoidance system does not activate the braking device in response to receipt of the object signal from the at least one object sensor.

9. The control system of claim 8, wherein the at least one object sensor comprises at least one of an imager, a light detection and ranging (LIDAR) sensor, a sound navigation ranging (SONAR) sensor, or a radio detection and ranging (RADAR) sensor.

10. The control system of claim 8, wherein the collision avoidance system further comprises a warning system comprising a warning device and configured to activate the warning device upon receipt of the object signal indicative of the object.

11. The control system of claim 8, wherein the at least one inclination sensor comprises at least one of an accelerometer or an inertial measurement unit.

12. The control system of claim 8, wherein the adjusted ground plane angle is substantially equal to the inclination angle.

13. The control system of claim 8, wherein the adjusted ground plane angle ranges from about two degrees greater than the inclination angle to about two degrees less than the inclination angle.

14. The control system of claim 8, wherein during level operation, an axis extending between (1) a contact surface between a front wheel of the machine and terrain supporting the front wheel and (2) a contact surface between a rear wheel of the machine and terrain supporting the rear wheel, is substantially horizontal.

15. The control system of claim 14, wherein an actual ground plane is substantially parallel to the axis, and wherein the modifier system controller is configured to modify operation of the collision avoidance system, such that the braking device is not activated upon detection of an object between the actual ground plane and the virtual ground plane.

16. The control system of claim 15, wherein the actual ground plane and the virtual ground plane define an acute angle.

17. A method for modifying operation of a collision avoidance system associated with a machine, the method comprising:
receiving an inclination signal indicative of an inclination angle at which a machine is operating relative to level operation;
determining, based at least in part on the inclination signal, an inclination angle at which the machine is operating relative to level operation;
determining, based at least in part on the inclination angle, an adjusted ground plane angle indicative of a virtual ground plane on which the machine is operating; and
communicating with a collision avoidance system, such that the collision avoidance system does not activate a braking device in response to an object sensor generating an object signal indicative of detection of an object between an actual ground plane and the virtual ground plane.

18. The method of claim 17, wherein determining the adjusted ground plane angle comprises setting the adjusted ground plane angle substantially equal to the inclination angle.

19. The method of claim 17, wherein determining the adjusted ground plane angle comprises setting the adjusted ground plane angle such that it ranges from about two degrees greater than the inclination angle to about two degrees less than the inclination angle.

20. The method of claim 17, wherein during level operation, an axis extending between (1) a contact surface between a front wheel of the machine and terrain supporting the front wheel and (2) a contact surface between a rear wheel of the machine and terrain supporting the rear wheel, is substantially horizontal, and the actual ground plane is substantially parallel to the axis.

* * * * *